United States Patent
Suzuki (10) Patent No.: US 9,734,767 B2
(45) Date of Patent: Aug. 15, 2017

(54) ELECTRONIC DEVICE EQUIPPED WITH A BACKLIGHT, CONTROL METHOD FOR THE SAME, AND STORAGE MEDIUM HAVING CONTROL PROGRAM STORED THEREON

(71) Applicant: CASIO COMPUTER CO., LTD., Shibuya-ku, Tokyo (JP)

(72) Inventor: Hideo Suzuki, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/838,769

(22) Filed: Aug. 28, 2015

(65) Prior Publication Data
US 2016/0086554 A1    Mar. 24, 2016

(30) Foreign Application Priority Data
Sep. 22, 2014    (JP) ................ 2014-192390

(51) Int. Cl.
*G09G 3/34* (2006.01)
*G06F 1/16* (2006.01)
*G06F 1/32* (2006.01)

(52) U.S. Cl.
CPC ......... *G09G 3/3406* (2013.01); *G06F 1/1626* (2013.01); *G06F 1/1647* (2013.01); *G06F 1/3215* (2013.01); *G06F 1/3218* (2013.01); *G06F 1/3231* (2013.01); *G06F 1/3265* (2013.01); *G06F 1/3293* (2013.01); *G09G 2320/064* (2013.01); *G09G 2320/0633* (2013.01); *G09G 2330/022* (2013.01); *Y02B 60/121* (2013.01); *Y02B 60/1242* (2013.01); *Y02B 60/1289* (2013.01); *Y02B 60/32* (2013.01)

(58) Field of Classification Search
None
See application file for complete search history.

(56) References Cited

U.S. PATENT DOCUMENTS

| 6,035,408 A | * | 3/2000 | Huang ................ G06F 1/3203 713/300 |
| 2007/0120808 A1 | * | 5/2007 | Shimoda ............ G09G 3/3413 345/102 |
| 2010/0091025 A1 | * | 4/2010 | Nugent ................ G09G 5/363 345/502 |
| 2013/0162700 A1 | * | 6/2013 | Yamakawa .......... G09G 3/3426 345/690 |

(Continued)

FOREIGN PATENT DOCUMENTS

| JP | 2013140158 A | 7/2013 |
| JP | 2013143996 A | 7/2013 |
| JP | 2014142480 A | 8/2014 |

*Primary Examiner* — David D Davis
(74) *Attorney, Agent, or Firm* — Holtz, Holtz & Volek PC (57) ABSTRACT

An electronic device includes a first processor, a second processor, and a light source. The first and second processors are configured such that the first processor can be shifted from a control state of controlling the light source to a non-control state of not controlling the light source and such that the second processor can be shifted from the non-control state of not controlling the light source to the control state of controlling the light source, along with a shift of the first processor from an operating state to a non-operating state.

14 Claims, 7 Drawing Sheets

(56) References Cited

U.S. PATENT DOCUMENTS

| | | | |
|---|---|---|---|
| 2014/0077625 A1* | 3/2014 | Amagai | G06F 1/163 307/121 |
| 2014/0139461 A1* | 5/2014 | Furukawa | G09G 3/342 345/173 |
| 2014/0139498 A1* | 5/2014 | Hussain | G09G 3/342 345/204 |
| 2014/0139499 A1* | 5/2014 | Hussain | H05B 33/0827 345/204 |

* cited by examiner

FIG. 7

ELECTRONIC DEVICE EQUIPPED WITH A BACKLIGHT, CONTROL METHOD FOR THE SAME, AND STORAGE MEDIUM HAVING CONTROL PROGRAM STORED THEREON

CROSS-REFERENCE TO RELATED APPLICATION

This application is based upon and claims the benefit of priority from the prior Japanese Patent Application No. 2014-192390, filed Sep. 22, 2014, the entire contents of which are incorporated herein by reference.

BACKGROUND OF THE INVENTION

1. Field of the Invention

The present invention relates to light source control technology suitable for an electronic device that is worn on or carried by a user.

2. Description of the Related Art

In recent years, various products to be worn on the human body have been developed for recording and analyzing various data at the time of exercise such as running, cycling, swimming, or trekking or in daily lives, and so-called sports watches that are worn on the body of the user and has a function for providing a user with exercise data or the like collected and analyzed at the time of exercise have been available on the market. Furthermore, portable electronic devices such as portable telephones, smartphones (multifunctional portable telephones), and tablet terminals have been widely available. Most of these electronic devices include a display device for providing various information to its user.

Here, various types of display devices are applied in these portable electronic devices. As display devices for achieving high display quality and screen luminance, display devices including a transmission-type display panel and a backlight are often used. However, in these display devices, the power consumption of the backlight and an arithmetic circuit is generally large, whereby the driving time of the electronic device is disadvantageously shortened. In order to solve this problem, various methods have been proposed to save the power of the display devices including a backlight.

For example, Japanese Patent Application Laid-Open (Kokai) Publication No. 2014-142480 discloses a method in which a normal mode and a power saving mode are provided as operation modes of a display device. In the power saving mode, the amount of light emission of a backlight is controlled based on the characteristics of the luminance of light emitted from the backlight with respect to the luminance of video displayed on a display panel, whereby the power consumption is reduced while inhibiting a decrease in the luminance of the video.

SUMMARY OF THE INVENTION

In accordance with one aspect of the present invention, an electronic device includes a first processor, a second processor, and a light source. The first and second processors are configured such that the first processor can be shifted from a control state of controlling the light source to a non-control state of not controlling the light source and such that the second processor can be shifted from the non-control state of not controlling the light source to the control state of controlling the light source, along with a shift of the first processor from an operating state to a non-operating state.

In accordance with another aspect of the present invention, a method is provided for controlling an electronic device including a first processor, a second processor, and a light source. The method includes shifting the first processor from a control state of controlling the light source to a non-control state of not controlling the light source, and shifting the second processor from the non-control state of not controlling the light source to the control state of controlling the light source, along with a shift of the first processor from an operating state to a non-operating state.

In accordance with another aspect of the present invention, a non-transitory computer-readable storage medium is provided that has stored thereon a program for controlling an electronic device including a first processor, a second processor, and a light source. The program is executable by a computer including the first processor and the second processor to perform functions including shifting the first processor from a control state of controlling the light source to a non-control state of not controlling the light source, and shifting the second processor from the non-control state of not controlling the light source to the control state of controlling the light source, along with a shift of the first processor from an operating state to a non-operating state.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereafter, an electronic device including a light source device, and a control method and a control program for the electronic device according to the present invention are described in detail by presenting embodiments.

<First Embodiment>

(Light Source Device and Electronic Device)

Figure 1A:
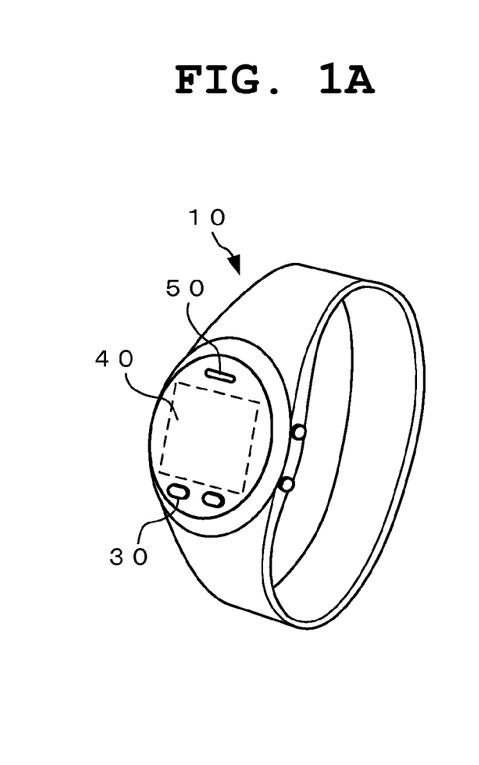
FIG. 1A is a schematic perspective view of a specific example of an electronic device according to the present invention.
Figure 1B:
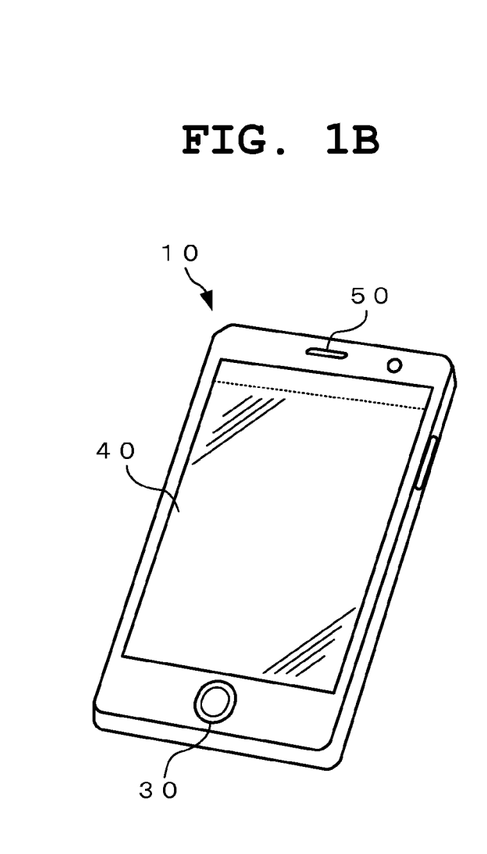
FIG. 1B is a schematic perspective view of another specific example of the electronic device according to the present invention.
Figure 1C:
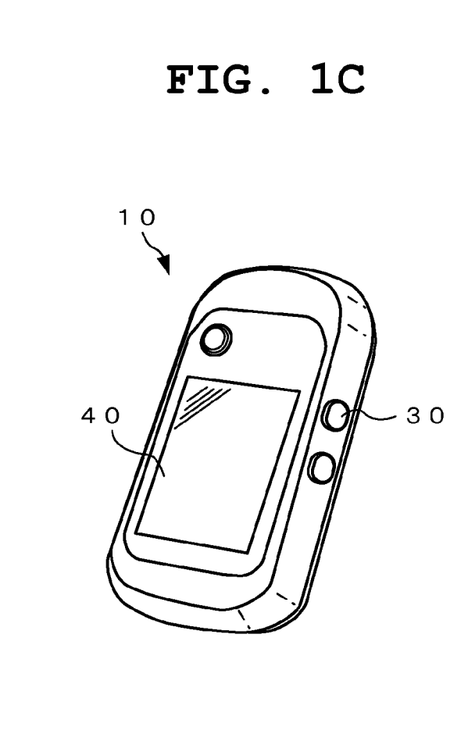
FIG. 1C is a schematic perspective view of still another specific example of the electronic device according to the present invention.
Figure 2:
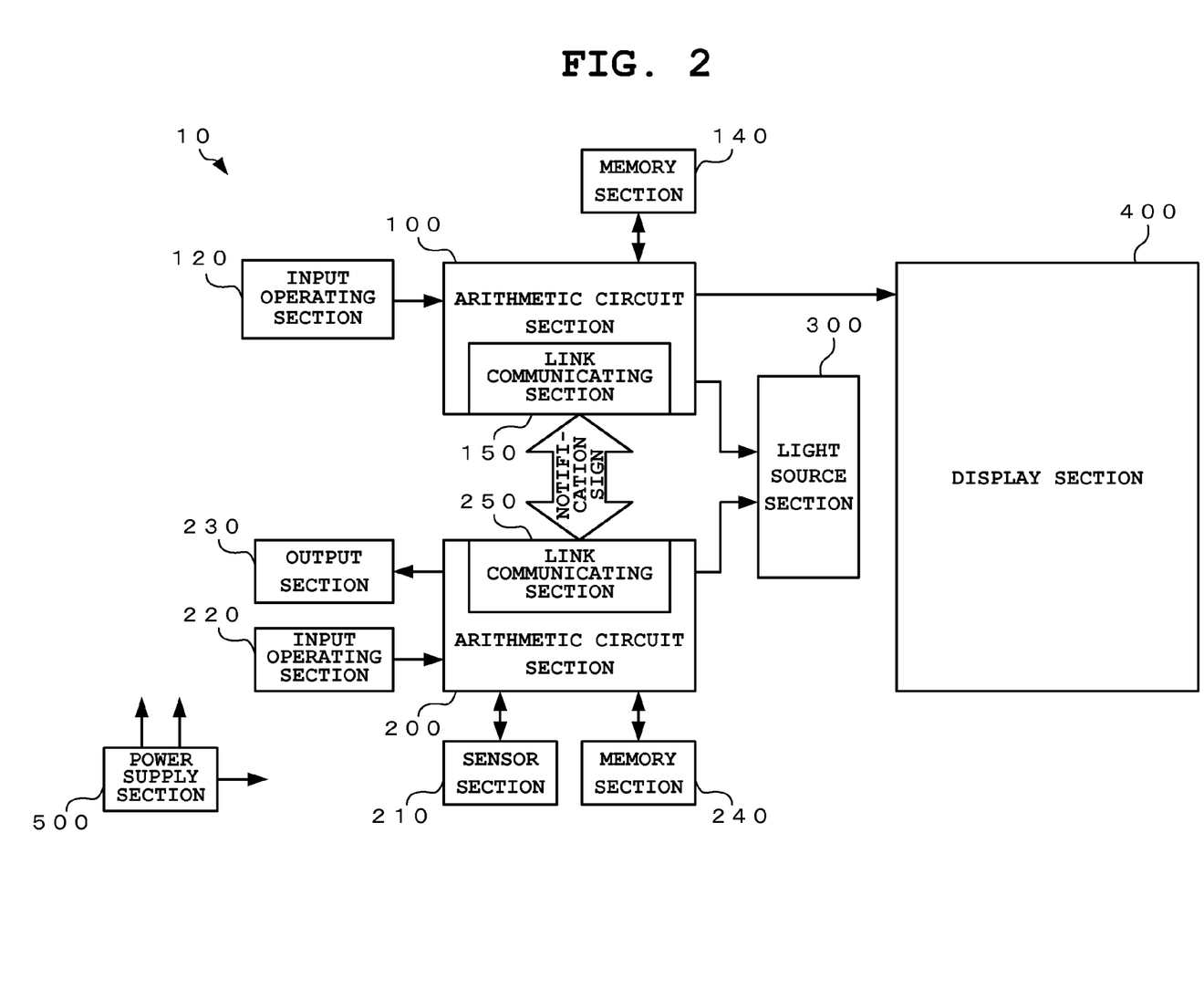
FIG. 2 is a schematic block diagram showing a first embodiment of the electronic device including a light source device according to the present invention.
Figure 3A:
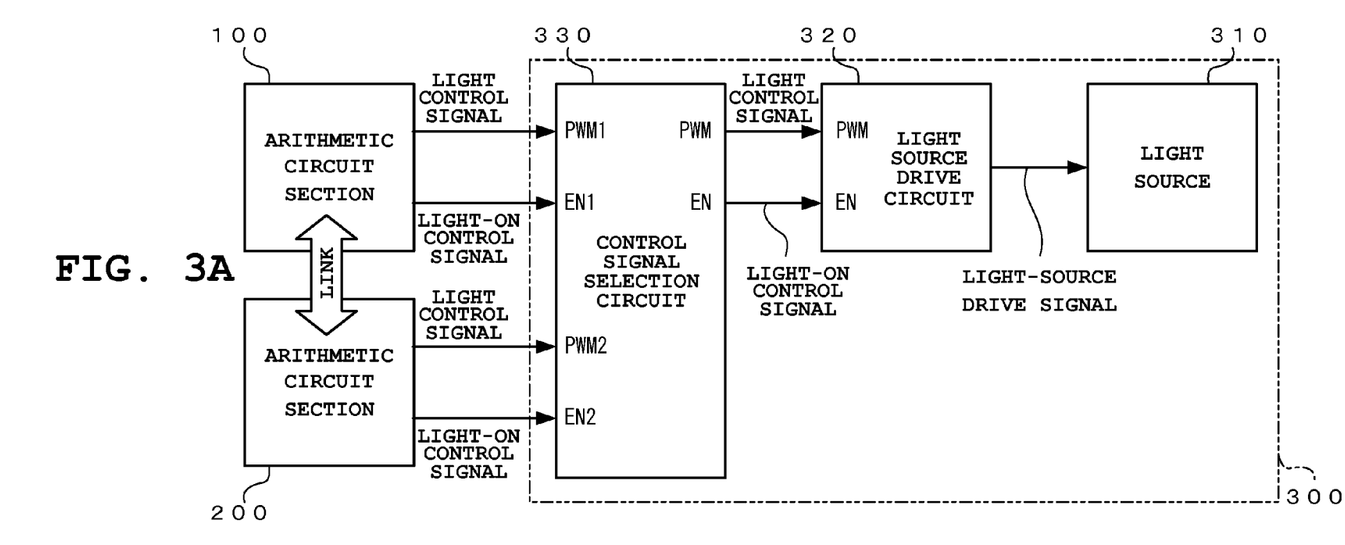
FIG. 3A is a schematic block diagram showing an example of the light source device to be applied in the electronic device according to the first embodiment.
Figure 3B:
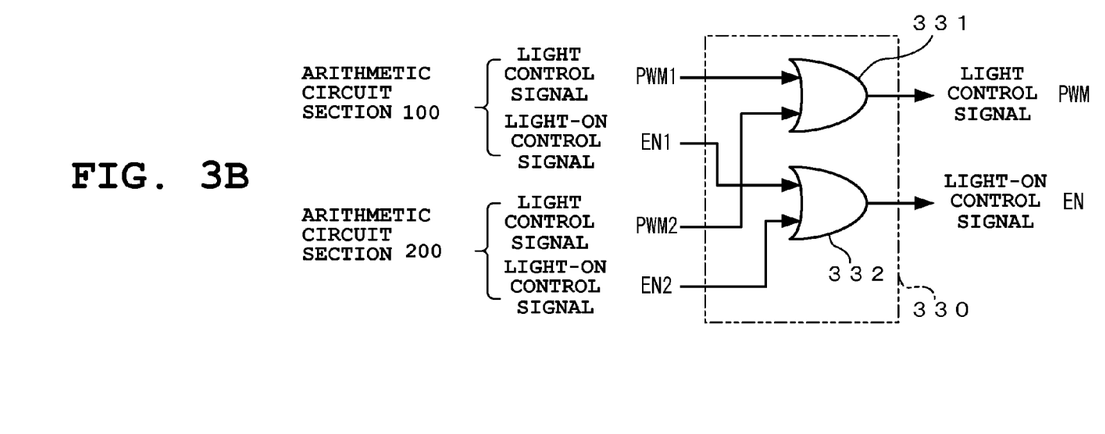
FIG. 3B is also a schematic block diagram showing the example of the light source device to be applied to the electronic device according to the first embodiment.

FIG. 1A to FIG. 1C are schematic perspective views of specific examples of the electronic device according to the present invention, and FIG. 2 is a schematic block diagram showing a first embodiment of the electronic device including alight source device according to the present invention. FIG. 3A and FIG. 3B are schematic block diagrams showing an example of the light source device to be applied in the electronic device according to the present embodiment.

The electronic device 10 having the light source device according to the present invention is structured to include, for example, a display panel 40 for displaying at least various information, as depicted in FIG. 1A to FIG. 1C, This electronic device 10 may have an outer appearance of a wristwatch type or wristband type. For example, the electronic device 10 may be a sports watch or a smartwatch that is worn on the body of a user, as depicted in FIG. 1A. Also, the electronic device 10 may be a smartphone or portable telephone as depicted in FIG. 1B, or be a portable device (such as a GPS logger) that is used outdoors, as depicted in FIG. 1C. Note that, in FIG. 1A to FIG. 1C, reference numeral 30 denotes an input operating section such as a button switch, and reference numeral 50 denotes an output section such as a loudspeaker or buzzer.

The electronic device 10 according to the present embodiment specifically has, for example, a set of two arithmetic circuit sections (a first arithmetic circuit section and a second arithmetic circuit section) 100 and 200, as depicted in FIG. 2. To the arithmetic circuit section 100, at least an input operating section 120, a memory section 140, a light source section 300, and a display section (a first display panel) 400 are connected. Also, to the arithmetic circuit section 200, at least a sensor section 210, an input operating section 220, an output section 230, a memory section 240, and a light source section 300 are connected. Here, the input operating section 120, the memory section 140, and the display section 400 are peripheral circuit sections that are connected to the arithmetic circuit section 100 according to the present invention.

The arithmetic circuit section 100 is an arithmetic operation device such as a CPU (Central Processing Unit) or MPU (Micro Processor). By executing a predetermined control program or algorithm program, the arithmetic circuit section 100 performs, for example, control in accordance with an operation signal from the input operating section 120, or controls the display of various information in the display section 400 described below.

Also the arithmetic circuit section (processor) 100, which includes a link communicating section 150, transmits and receives a predetermined notification signal to and from the arithmetic circuit section (processor) 200 described below, and thereby controls the light on/off state and light emission luminance (or light emission amount) of the light source section 300 by being linked and synchronized with the arithmetic circuit section 200.

The link communicating section 150 has a connection port of a synchronous serial communication standard such as known UART (Universal Asynchronous Receiver Transmitter) or I2C (Inter-Integrated Circuit) and, by being connected to a link communicating section 250 described below, transmits and receives a predetermined notification signal for controlling at least the light on/off state and light emission luminance (or light emission amount) of the light source section 300. Note that a method for controlling the electronic device 10 according to the present embodiment will be described further below in detail.

The arithmetic circuit section 100 applied in the present embodiment has at least a processing power that is high enough to control high-functionality display on the display section 400 (for example, color display and visual effects of high-definition still images and moving images). That is, as the arithmetic circuit section 100, an arithmetic circuit having a relatively high processing power is adopted. This arithmetic circuit generally performs various processing operations at high operating frequency, and therefore has relatively large power consumption. In other words, as the arithmetic circuit section 100, an arithmetic circuit with a relatively high processing power and relatively high power consumption (high-power, high-performance processor) is required to be adopted. Here, the control program and algorithm program to be executed by the arithmetic circuit section 100 may be stored in the memory section 140 or may be incorporated in advance in the arithmetic circuit section 100.

The input operating section 120 is input means such as a touch panel arranged on the view field side of a display panel (corresponding to the display panel 40 depicted in FIG. 1A to FIG. 1C) provided on the display section 400 described below, and outputs various operation signals generated by a user input operation to the arithmetic circuit section 100. As a result, in the arithmetic circuit section 100, items and information to be displayed on the display section 400 are selected and set.

The memory section 140 has stored therein data for use and generated in executing a predetermined control program and algorithm program by the arithmetic circuit section 100, data for display on the display section 400, and the like. Also, the memory section 140 may have stored therein a control program and algorithm program that is executed by the arithmetic circuit section 100. Note that the memory section 140 may be partially or entirely in a form of a removable storage medium such as a memory card, and may be structured to be removable from the electronic device 10.

As with the above-described arithmetic circuit section 100, the arithmetic circuit section 200 is an arithmetic operation device such as a CPU or MPU. By executing a predetermined control program or algorithm program, the arithmetic circuit section 200 controls a sensing operation by the sensor section 210, performs control in accordance with an operation signal from the input operating section 220, or controls the provision of various information by the output section 230. Also, the arithmetic circuit section 200 includes a link communicating section 250 having a structure equivalent to that of the link communicating section 150 provided to the above-described arithmetic circuit section 100. By transmitting and receiving a predetermined notification signal to and from the above-described arithmetic circuit section 100, the arithmetic circuit section 200 controls the light source section 300 by being linked and synchronized with the arithmetic circuit section 100.

Here, the arithmetic circuit section 200 applied in the present embodiment is only required to have a processing power that is enough to control the sensor section 210 which periodically performs sensing operations, and the like. That is, as the arithmetic circuit section 200, an arithmetic circuit having a relatively low processing power can be adopted. Since this arithmetic circuit can generally perform processing operation with low operating frequency, power consumption can be relatively saved at the time of operation. In other words, as the arithmetic circuit section 200, an arithmetic circuit with a relatively low processing power and relatively low power consumption already provided to the electronic device 10 for use in, for example, a clock (low-power, low-performance processor) can be adopted.

That is, the arithmetic circuit section 200 has an operating frequency lower than that of the arithmetic circuit section 100 and power consumption at the time of operation lower than that of the arithmetic circuit section 100. Here, the control program and the algorithm program to be executed by the arithmetic circuit section 200 may be stored in the memory section 240 or may be incorporated in advance in the arithmetic circuit section 200.

The sensor section 210 is sensor means such as an acceleration sensor, gyro sensor, geomagnetic sensor, atmospheric pressure sensor, temperature-humidity sensor, pulse sensor, and heart rate sensor, or positioning means including a GPS receiving section. The sensor section 210 acquires various physical, biological, and/or geographical data of the user during exercise or in the daily life (hereinafter collectively referred to as "sensor data") and outputs it to the arithmetic circuit section 200. Here, the sensors such as an acceleration sensor, gyro sensor, and geomagnetic sensor perform sensing operations during the user's exercise at 100 or more cycles per second (a sampling frequency equal to or more than 100 Hz), and output sensor data to the arithmetic circuit section 200. Also, the positioning means by GPS performs a sensing operation in a cycle of, for example, once in one to several seconds, and outputs positioning data to the arithmetic circuit section 200.

The input operating section 220 is input means such as a button switch, slide switch, or microphone provided on the housing of the electronic device 10, and outputs various operation signals generated in response to the user's input operations to the arithmetic circuit section 200. As a result, the arithmetic circuit section 200 performs the setting and control of the above-described sensing operations by the sensor section 210, and the selection, setting, and the like of item and information to be displayed on the display section 400.

The output section 230, which is acoustic means such as a buzzer or loudspeaker or vibration means such as a vibration motor or vibrator, generates sound information such as a predetermined tone color, sound pattern, or audio message, or vibration information such as a predetermined vibration pattern or its intensity, and thereby aurally or tactually provides or informs the user with or of various information. Here, the output section 230 may generate predetermined sound information or vibration information in association with various information displayed on the display section 400 described below.

The memory section 240 stores sensor data and the like acquired by the sensor section 210 in a predetermined storage area. Also, the memory section 240 stores data that is used or generated when a predetermined control program or an algorithm program is executed by the arithmetic circuit section 200. This memory section 240 may store a control program and an algorithm program to be executed by the arithmetic circuit section 200. Note that the memory section 240 may be integrally structured with the memory section 140 connected to the arithmetic circuit section 100 described above.

The light source section 300 includes a light source 310, a light source drive circuit 320, and a control signal selection circuit 330, as depicted in FIG. 3A. This light source section 300 performs control to light the light source 310 in a predetermined light emission state, based on the display status of a display panel provided to the display section 400 described below and a user input operation by the input operating sections 120 and 220.

The light source 310 is arranged on, for example, the back surface side (opposite to a user view field side) of the display panel, and a surface light source using a plurality of LEDs (Light-Emitting Elements) and various optical members such as a light guide plate and a light diffusion film is applied. The display luminance of the display panel is controlled in accordance with the light emission luminance of the light source 310. Note that the light source 310 is not necessarily required to form a backlight arranged on the back surface side of the display panel, and may form a front light arranged on the view field side of the display panel.

In accordance with the operation status of the arithmetic circuit section 100 and the operation status of the arithmetic circuit section 200 which operate in conjunction with each other, the control signal selection circuit 330 supplies control signals (light source control signals; a light-on control signal EN for setting a light-on/light-off state of the light source 310 and a light control signal PWM for setting the light emission luminance of the light source 310) outputted from the arithmetic circuit section 100 and the arithmetic circuit section 200 to the light source drive circuit 320, as depicted in FIG. 2 and FIG. 3A.

Here, in the configuration of the present embodiment, the light-on control signal EN and the light control signal PWM are outputted from one of the arithmetic circuit section 100 and the arithmetic circuit section 200. When a light-on control signal EN1 and a light control signal PWM1 are outputted from the arithmetic circuit section 100, the control signal selection circuit 330 supplies these signals as the light-on control signal EN and the light control signal PWM to the light source drive circuit 320. When a light-on control signal EN2 and a light control signal PWM2 are outputted from the arithmetic circuit section 200, the control signal selection circuit 330 supplies these signals as the light-on control signal EN and the light control signal PWM to the light source drive circuit 320.

Then, based on the control signals supplied via the control signal selection circuit 330, the light source drive circuit 320 supplies a light source drive signal to the light source 310, and thereby controls the light-on (ON)/light-off (OFF) state and light emission luminance of the light source 310.

Here, the control signal selection circuit 330 may have a structure where a set of two logical OR circuits (hereinafter referred to as "OR circuits") 331 and 332 are provided, as depicted in FIG. 3B. The OR circuit 331 takes the light control signals PWM1 and PWM2 outputted from the arithmetic circuit section 100 and the arithmetic circuit section 200 as inputs, and outputs a logical OR output thereof to the light source drive circuit 320 as the light control signal PWM. Also, the OR circuit 332 takes the light-on control signals EN1 and EN2 outputted from the arithmetic circuit section 100 and the arithmetic circuit section 200 as inputs, and outputs a logical OR output thereof to the light source drive circuit 320 as the light-on control signal EN. As a result, when a control signal is outputted from one of the arithmetic circuit section 100 and the arithmetic circuit section 200, this control signal is outputted to the light source drive circuit 320 as a light control signal or a light-on control signal.

In the present embodiment, the light source drive circuit 320 and the control signal selection circuit 330 have separate structures, as depicted in FIG. 3A and FIG. 3B. However, the structure of the light source section 300 is not limited thereto. For example, the control signal selection circuit 330 may be provided inside the light source drive circuit 320. Also, the circuit structure of the control signal selection circuit 330 depicted in FIG. 3B is merely an example, and the control signal selection circuit 330 may have another circuit structure as long as it can achieve equivalent functions.

The display section 400 includes, although omitted in the drawing, a transmission-type display panel, an image memory, and a display driver. As the display panel, for example, a transmission-type TFT (Thin Film Transistor) color liquid-crystal panel can be adopted, which displays various information generated by the arithmetic circuit section 100 in a predetermined form. Here, in the present embodiment, the display section 400 is controlled so that high-functionality display (color display and visual effects of high-definition still images and moving images) and the like can be achieved. That is, by the light source provided on the back surface side being lit with a predetermined color image or the like being displayed on the display panel based on the characteristics of the transmission-type color display panel, a high-luminance color image is visually recognized by the user. In particular, in the present embodiment, the light emission status (light emission, light-off state, and light emission luminance) of the light source 310 provided to the light source section 300 is controlled by the arithmetic circuit section 100 or the arithmetic circuit section 200, in accordance with the display status of a color image or the like displayed on the display panel or a user input operation.

The above-described sections achieve each function by driving power supplied from the power supply section 500, as depicted in FIG. 2. Here, as the power supply section 500, a primary battery such as a commercially-available coin-shaped battery or button-shaped battery, a secondary battery such as a lithium-ion battery or a nickel-hydride battery, or the like is adopted. Also, in addition to the above-described primary battery and secondary battery, a power supply by energy harvest technology for generating electricity by energy such as vibrations, light, heat, and electro-magnetic waves can be used singly or in combination.

Although omitted in FIG. 2, FIG. 3A, and FIG. 3B in the above-described embodiment, the arithmetic circuit section 100 and the arithmetic circuit section 200 may include a communication interface section (hereinafter abbreviated as a "communication I/F section") that transmits and receives various data and signals to and from a device provided outside the electronic device 10 (hereinafter referred to as an "external device") by a predetermined wired or wireless communication method. Here, in a case where a communication I/F section is provided in the (high-power, high-performance) arithmetic circuit section 100 and data and the like are transmitted to and received from an external device (for example, a high-functionality information processing device such as a smartphone or personal computer) via wireless communication, a wireless communication method by which relatively large-volume data can be transmitted and received at high speed is applied, such as Bluetooth (registered trademark) communication or Wi-Fi (wireless fidelity (registered trademark)) communication. Also, in a case where a communication I/F section provided in the arithmetic circuit section 200 transmits and receives data and the like to and from an external device via wired communication, a wired communication method meeting a high-speed and large-capacity communication standard such as USB (Universal Serial Bus) standard is applied. On the other hand, in a case where a communication I/F section is provided in the (low-power, low-performance) arithmetic circuit section 200 and data and the like are transmitted to and received from an external device (for example, a sensor device worn on another body part) via wireless communication, a wireless communication method with low power consumption, such as Bluetooth (registered trademark) low energy (LE) communication, is applied. Furthermore, in a case where a communication I/F section provided in the arithmetic circuit section 200 transmits and receives data and the like to and from an external device via wired communication, a wired communication method with low power consumption and relatively low speed, such as USB standard, is applied.

(Electronic Device Control Method)

Next, an electronic device control method according to the present embodiment is described. Here, the control method is described by using a case where the portable electronic device 10 depicted in FIG. 1A to FIG. 1C is worn on the body of the user or carried by the user performing exercise such as running or walking or living in daily life and various information are displayed on the display panel 40 and provided to the user. Note that a series of processing operations described below are achieved by a predetermined algorithm program being executed by the arithmetic circuit section 100 and the arithmetic circuit section 200.

Figure 4:
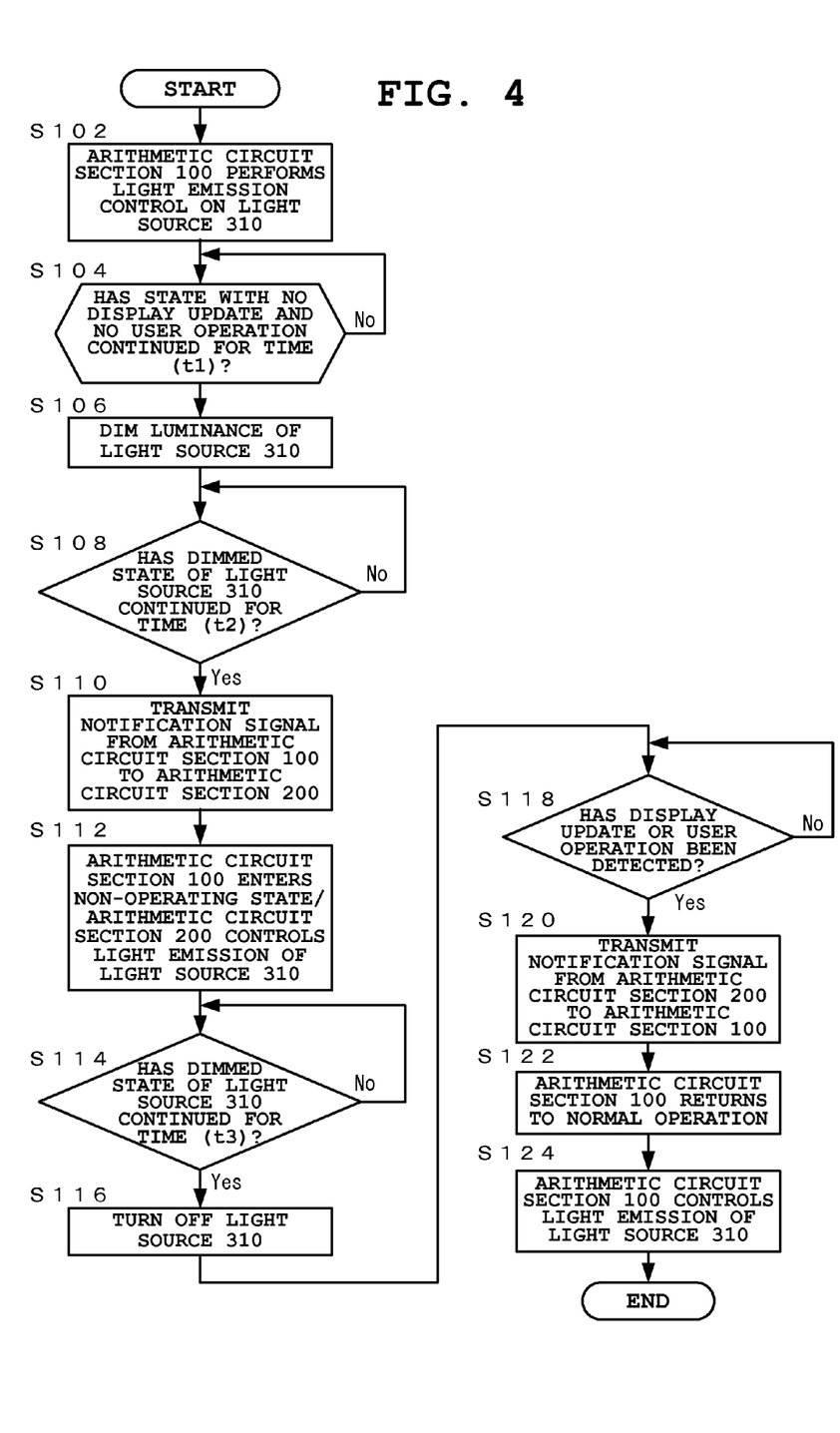
FIG. 4 is a flowchart of an example of a method for controlling the electronic device according to the first embodiment.
Figure 5:
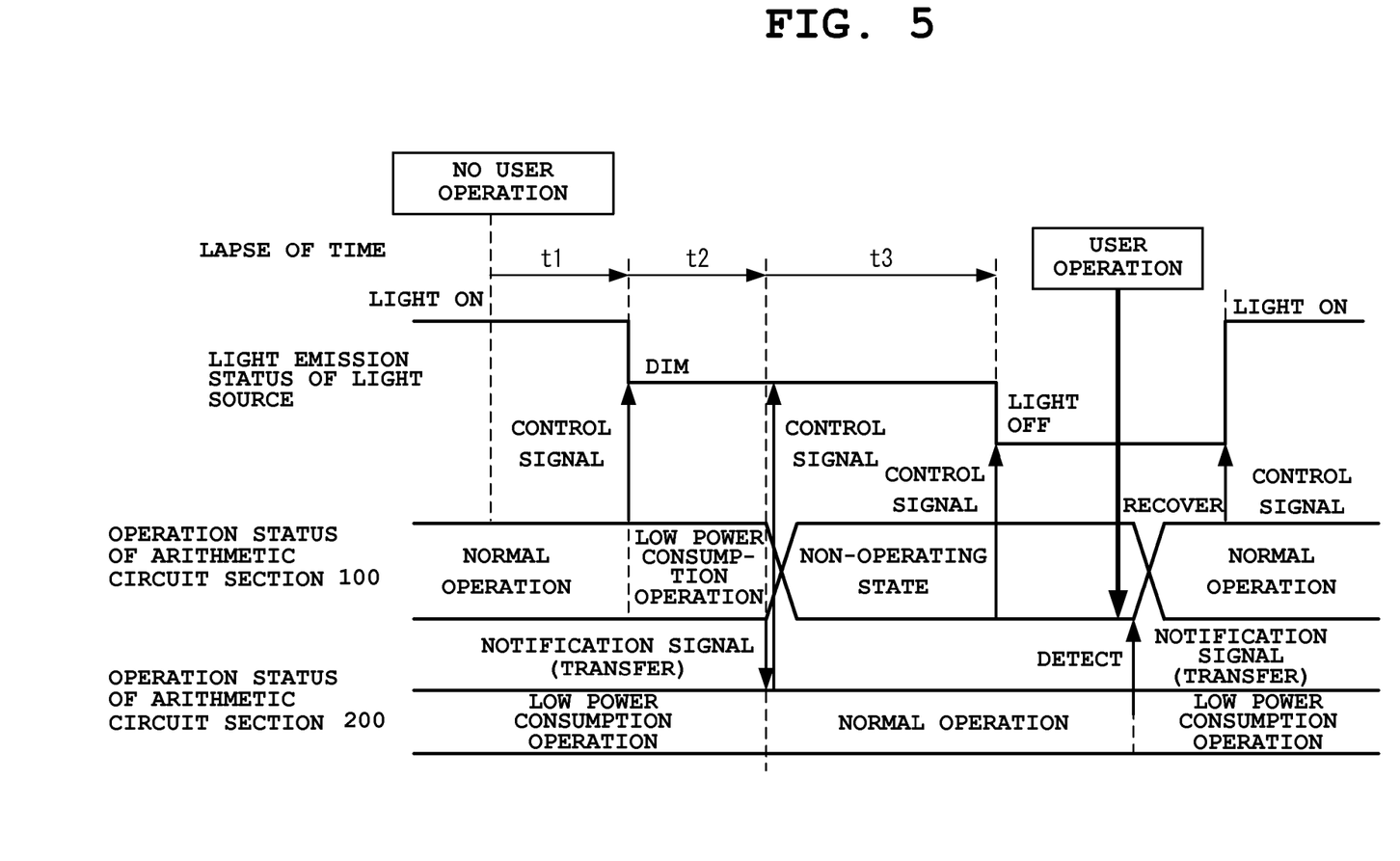
FIG. 5 is a timing chart of an example of the method for controlling the electronic device according to the first embodiment.

FIG. 4 is a flowchart of an example of the control method for the electronic device according to the first embodiment. FIG. 5 is a timing chart of an example of the control method for the electronic device according to the first embodiment. Here, when necessary, description is made with reference to the above-described structures of the electronic device and the light source device (refer to FIG. 2, FIG. 3A, and FIG. 3B) as appropriate.

In the electronic device control method according to the present embodiment, for example, when the electronic device 10 worn on the body of the user (or carried by the user) is turned on for operation, driving power is supplied from the power supply section 500 and a normal operation is performed, as depicted in the flowchart of FIG. 4 and the timing chart of FIG. 5.

In this normal operation, various information generated by the arithmetic circuit section 100 are displayed on the display panel of the display section 400 in a predetermined form, and the light source 310 provided on the back surface side of the display panel is controlled in a light-on state (Step S102). Specifically, the arithmetic circuit section 100 outputs the light-on control signal EN1 for setting the light source 310 in a light-on (ON) state and the light control signal PWM1 for setting light emission luminance to the light source drive circuit 320 via the control signal selection circuit 330. As a result, the light source 310 is lit with predetermined light emission luminance in accordance with the pulse width of the light control signal PWM1 to apply light from the back surface side of the display panel, and thereby causes the information displayed on the display section 400 (screen display) to be visually recognized by the user.

Next, in the above-described normal operation, for example, when a state where the screen display of the display panel has not been updated and a user input operation has not been detected is continued for a predetermined period of time (t1) (Step S104) as depicted in FIG. 5, the arithmetic circuit section 100 performs a low power consumption operation. In this low power consumption operation, by outputting the light control signal PWM1 set to have a short pulse width to the light source drive circuit 320 via the control signal selection circuit 330, the arithmetic circuit section 100 dims the light emission luminance of the light source 310 (Step S106).

Here, the lapse of the predetermined time (t1) is measured (time-counted) by the arithmetic circuit section 100. Also, the user input operation in the present embodiment (abbreviated as "user operation" in FIG. 4 and FIG. 5) corresponds to, for example, an intentional operation by the user on the touch panel of the input operating section 120 or on the button switch or the like of the input operating section 220, or a motion of lifting the electronic device 10 in a stationary state (for example, a state in which the electronic device 10 is stationary on a table) or applying specific vibrations, impact, tilting, or the like. The operation on the touch panel of the input operating section 120 is directly detected by the arithmetic circuit section 100. Also, the operation on the button switch or the like of the input operating section 220 is detected by the arithmetic circuit section 200, and the detection result is transmitted via a notification signal to the arithmetic circuit section 100. Also, regarding the motion of lifting the electronic device 10 or applying specific vibrations, impact, tilting, or the like, a monitoring operation for an output from any of various sensors (for example, an acceleration sensor) of the sensor section 210 is performed by the arithmetic circuit section 200, and the monitoring result is transmitted via a notification signal to the arithmetic circuit section 100.

Next, in a dimmed state in the low power consumption operation described above, when a state where screen display has not been updated and a user input operation has not been detected is continued for a predetermined period of time (t2) (Step S108) as depicted in FIG. 5, the arithmetic circuit section 100 transmits a predetermined notification signal to the arithmetic circuit section 200 (Step S110), and enters a non-operating state (Step S112).

Specifically, the arithmetic circuit section 100 transmits a notification signal for notification of the shift of the operation status to the arithmetic circuit section 200 via the link communicating sections 150 and 250 to perform switching (transfer) so that the light source 310 is controlled by the arithmetic circuit section 200. Then, except a portion of the link communicating section 150 which receives a notification signal for notification of the shift of the operation status from the arithmetic circuit section 200, most of the functions including the control of the light source 310 is shifted to a non-operating state. Here, the lapse of the predetermined time (t2) is measured (time-counted) by the arithmetic circuit section 100.

Also, the shifting of the arithmetic circuit section 100 to a non-operating state is achieved by the arithmetic circuit section 100 or the arithmetic circuit section 200 by blocking or inhibiting the supply of driving power to the arithmetic circuit section 100 from the power supply section 500. Furthermore, the arithmetic circuit section 200, to which the control of the light source 310 has been transferred, outputs the light control signal PWM2 set to have a short pulse width to the light source drive circuit 320 via the control signal selection circuit 330 so that the above-described dimmed state is maintained (Step S112).

Next, when a state where screen display has not been updated and a user input operation has not been detected is continued for a predetermined period of time (t3) from the start of the control of the light source 310 by the arithmetic circuit section 200 (Step S114) as depicted in FIG. 5, the arithmetic circuit section 200 turns off the light source 310 and stops screen display on the display section 400 (Step S116).

Specifically, by outputting the light-on control signal EN2 for setting the light source 310 in a light-off (OFF) state to the light source drive circuit 320 via the control signal selection circuit 330, the arithmetic circuit section 200 turns off the light source 310 and enters a predetermined standby state. Here, the lapse of the predetermined time (t3) is measured (time-counted) by the arithmetic circuit section 200. In this standby state (the light-off state of the light source 310), the arithmetic circuit section 200 performs a monitoring operation for at least the update of screen display on the display section 400 and the presence or absence of a user input operation continuously or at predetermined time intervals.

Next, in the above-described standby state, when the update of screen display on the display section 400 or a user input operation is detected as depicted in FIG. 5 (Step S118), the arithmetic circuit section 200 transmits a predetermined notification signal to the arithmetic circuit section 100 (Step S120) to perform switching (transfer) so that the light source 310 is controlled by the arithmetic circuit section 100, and then stops the function regarding the control of the light source 310.

Specifically, the arithmetic circuit section 200 transmits a notification signal for notification of the shift of the operation status to the arithmetic circuit section 100 via the link communicating sections 250 and 150 so as to return the arithmetic circuit section 100 from a non-operating state to a normal operation (Step S122). As a result, switching (transfer) is performed so that the light source 310 is controlled by the arithmetic circuit section 100 (Step S124 or Step S102).

Here, the return of the arithmetic circuit section 100 from the non-operating state to a normal operation is achieved by the arithmetic circuit section 100 or the arithmetic circuit section 200 supplying or recovering driving power to the arithmetic circuit section 100 from the power supply section 500. Also, the arithmetic circuit section 100, to which the control of the light source 310 has been transferred, outputs the light-on control signal EN1 for setting the light source 310 in a light-on (ON) state and the light control signal PWM1 for setting light emission luminance to the light source drive circuit 320 via the control signal selection circuit 330 in accordance with the display status of screen display on the display panel. As a result, the light source 310 is lit with predetermined light emission luminance in accordance with the pulse width of the light control signal PWM1 and light is applied from the back surface side of the display panel, whereby screen display on the display panel is visually recognized by the user.

In the state where the arithmetic circuit section 100 has returned to a normal operation, the arithmetic circuit section 200 stops at least the light emission control for the light source 310 and the monitoring operation for the presence or absence of a user input operation, and performs a sensing operation by the sensor section 210, a clock display operation, and the like with low power consumption. Here, as with the arithmetic circuit section 100, the arithmetic circuit section 200 should preferably be controlled to be switched to perform a normal operation or a low power consumption operation based on the use amount of consumed power according to a processing operation. For example, when the arithmetic circuit section 100 is in the non-operating state, the arithmetic circuit section 200 performs a normal operation for light emission control for the light source 310 and a monitoring operation for a user input operation. Then, in the state where the arithmetic circuit section 100 has returned to the normal operation, the arithmetic circuit section 200 stops these operations and performs a low power consumption operation, as depicted in FIG. 5.

Although omitted in the flowchart of FIG. 4, the arithmetic circuit section 100 and the arithmetic circuit section 200 continuously perform a monitoring operation for an input operation for interrupting or ending processing operations and a change in the operation status during the execution of the series of processing operations described above. Then, when an input operation or a status change is detected, they forcibly end the processing operations. Specifically, the arithmetic circuit sections 100 and 200 detect a blocking (OFF) operation on the operation power supply by the user, a reduction in the remaining amount of the battery in the power supply section 500, an anomaly in a function or application being executed, and the like, and forcibly interrupt and end the series of processing operations.

Also, in the flowchart depicted in FIG. 4, when the arithmetic circuit section 100 is to return from the non-operating state to a normal operation, if a delay occurs until the light source 310 is lit as depicted in FIG. 5, the control of the light source 310 may be transferred to the arithmetic circuit section 100 after the control of lighting the light source 310 is performed by the arithmetic circuit section 200. As a result of this configuration, a delay on screen display with respect to a user input operation can be made less recognized by the user.

(Verification of Operations and Effects)

Next, operations and effects of the electronic device including the light source device and control method therefor according to the present embodiment are specifically described by providing a comparative example.

Figure 6A:
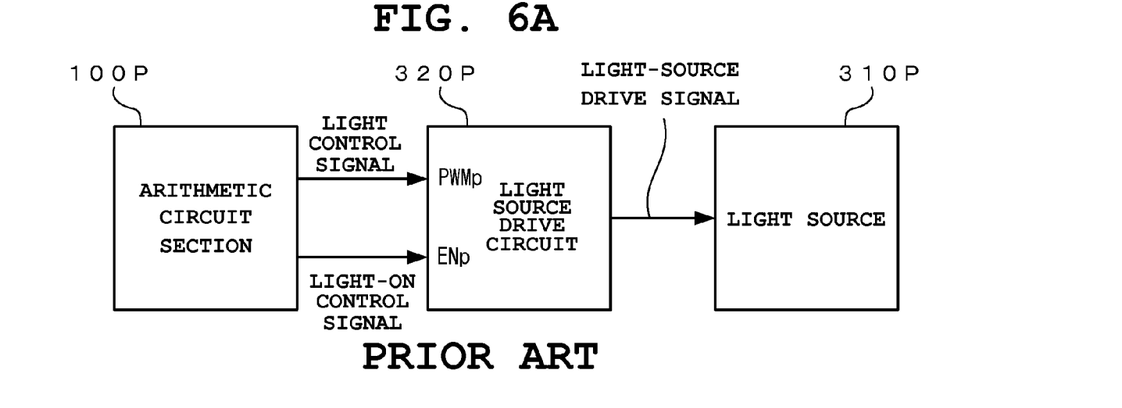
FIG. 6A is a diagram showing a comparative example for describing operations and effects of the first embodiment.
Figure 6B:
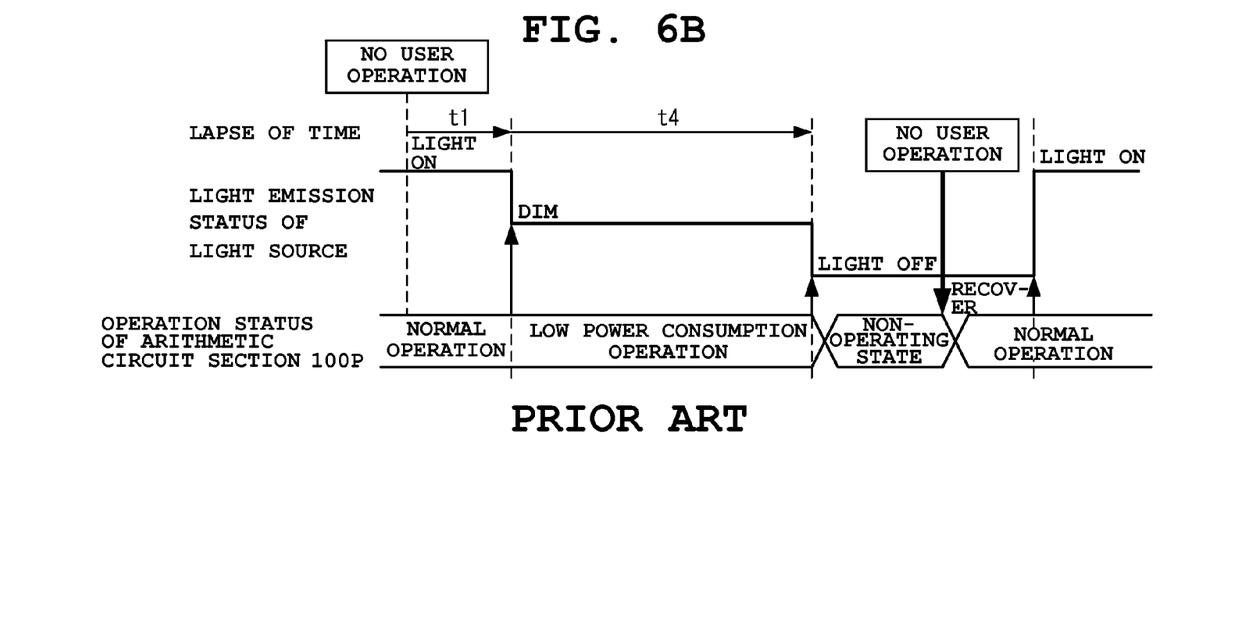
FIG. 6B is also a diagram showing the comparative example for describing the operations and effects of the first embodiment.

FIG. 6A and FIG. 6B are diagrams of the comparative example for describing the operations and effects of the present embodiment. FIG. 6A is a schematic block diagram showing the comparative example (related art), and FIG. 6B is a timing chart of a control method for the electronic device according to the comparative example. Here, for clarification of comparison between the components and the control method of the present embodiment and those of the comparative example, sections and a control method equivalent to those of the present embodiment are provided with the same reference numerals.

A light source device in the comparative example has, for example, an arithmetic circuit section 100P, a light source 310P, and a light source drive circuit 320P, as depicted in FIG. 6A. Here, although omitted in the drawings, the light source 310P is arranged on the back surface side of a transmission-type display panel. In this light source device, the light-on state and the light emission luminance of the light source 310 is controlled by the light source drive circuit 320P based on a light control signal PWMp and a light-on control signal ENp outputted from the arithmetic circuit section 100P.

When this light source device is applied in a portable electronic device such as that described in the present embodiment, a display section, a sensor section, an input operating section, an output section, and the like (all of them are omitted in the drawing) are controlled singly by the arithmetic circuit section 100P. As a result, as the arithmetic circuit section 100P, an arithmetic circuit with a relatively high processing power and relatively high power consumption (high-power, high-performance processor) is required to be adopted.

In a method for operating this light source device with low power consumption, for example, a normal operation is first performed in which various information generated by the arithmetic circuit section 100P are displayed on the display panel and the light source 310P is controlled to enter a light-on state, as depicted in FIG. 6B. Then, in this normal operation, when a state where the screen display of the display panel has not been updated and a user input operation has not been detected is continued for the predetermined period of time (t1), the arithmetic circuit section 100P outputs the light control signal PWMp set to have a short pulse width to the light source drive circuit 320P and performs a low power consumption operation where the light emission luminance of the light source 310P has been set to be dimmed.

Then, in the dimmed state in the low power consumption operation, when a state where the screen display of the display panel has not been updated and a user input operation has not been detected is continued for a predetermined period of time (t4), the arithmetic circuit section 100P outputs the light-on control signal EN2 for setting the light source 310 in a light-off state to the light source drive circuit 320P to cause the light source 310P to be turned off, and enters a non-operating state. Then, in this non-operating state, when an input operation or a status change is detected, the arithmetic circuit section 100P returns from the non-operating state to a normal operation and controls the light source 310P to be in a light-on state.

As such, in the light source device of the comparative example, the light emission status of the light source 310P is controlled singly by the arithmetic circuit section 100P. Here, during a period (normal operation period) in which the light source 310P is being controlled to be lit in accordance with the display status of screen display on the display panel and during a period (low power consumption operation period) in which the light source 310P is being controlled to be lit in a dimmed state as depicted in FIG. 6B, it is required to continuously output the light control signal PWMp for setting the light emission luminance of the light source 310P from the arithmetic circuit section 100P. As a result, the arithmetic circuit section 100P cannot enter a non-operating state during these periods, and the power consumption of the arithmetic circuit section 100P cannot be sufficiently reduced.

That is, since the arithmetic circuit section 100P can enter a non-operating state only when the light source 310P in the dimmed state is controlled to be turned off, a period where the arithmetic circuit section 100P does not operate is shortened and the power consumption of the arithmetic circuit section 100P cannot be sufficiently reduced.

By contrast, in the present embodiment described above, two arithmetic circuit sections 100 and 200 having different processing powers are provided. In a normal operation, the arithmetic circuit section 100 having a high processing power performs light emission control of lighting the light source 310 of the light source section 300 with predetermined light emission luminance, while performing predetermined display on the display section 400. Then, when a state where screen display on the display section 400 has not been updated and a user input operation has not been performed continues, the arithmetic circuit section 100 enters a non-operating state, and light emission control for the light source 310 of the light source section 300 and a monitoring operation for a user input operation are performed by the arithmetic circuit section 200 with low processing performance.

That is, the light source section 300 to be applied in the electronic device 10 according to the present embodiment is structured such that, by the arithmetic circuit section 100 and the arithmetic circuit section 200 operating in conjunction with each other by transmitting and receiving a notification signal therebetween, the light emission status of the light source 310 is controlled from both of the arithmetic circuit sections 100 and 200.

As such, in the present embodiment, when a processing load on the arithmetic circuit section 100 having a high processing power is relatively low because it is controlling only the light source section 300 and not performing other processing operations, part of the functions of the arithmetic circuit section 100 is performed by the arithmetic circuit section 200 having a low processing power, so that the arithmetic circuit section 100 can enter a non-operating state early. As a result, the period of the non-operating state of the arithmetic circuit section 100 is increased at maximum and the power consumption of the arithmetic circuit section 100 is reduced.

Also, the arithmetic circuit section 200 is not required to perform part of the functions of the arithmetic circuit section 100 in a period other than the period where the arithmetic circuit section 100 is in a non-operating state, whereby the arithmetic circuit section 200 can be operated with low power consumption. Accordingly, in the present embodiment, the driving time of the electronic device can be improved. Note that, since the light source section 300 is controlled by the arithmetic circuit section 100 having a high processing power when display contents on the display section 400 are frequently changed in the present embodiment, the light source can be finely controlled in accordance with the display contents without a time lag in control. When the display contents on the display section 400 are not to be changed, the light source section 300 is controlled by the arithmetic circuit section 200 having a low processing power, whereby a load on the arithmetic circuit section 100 is reduced and the power consumption is reduced.

<Second Embodiment>

Next, a second embodiment of the electronic device including the light source device according to the present invention is described in detail with reference to the drawings.

Figure 7:
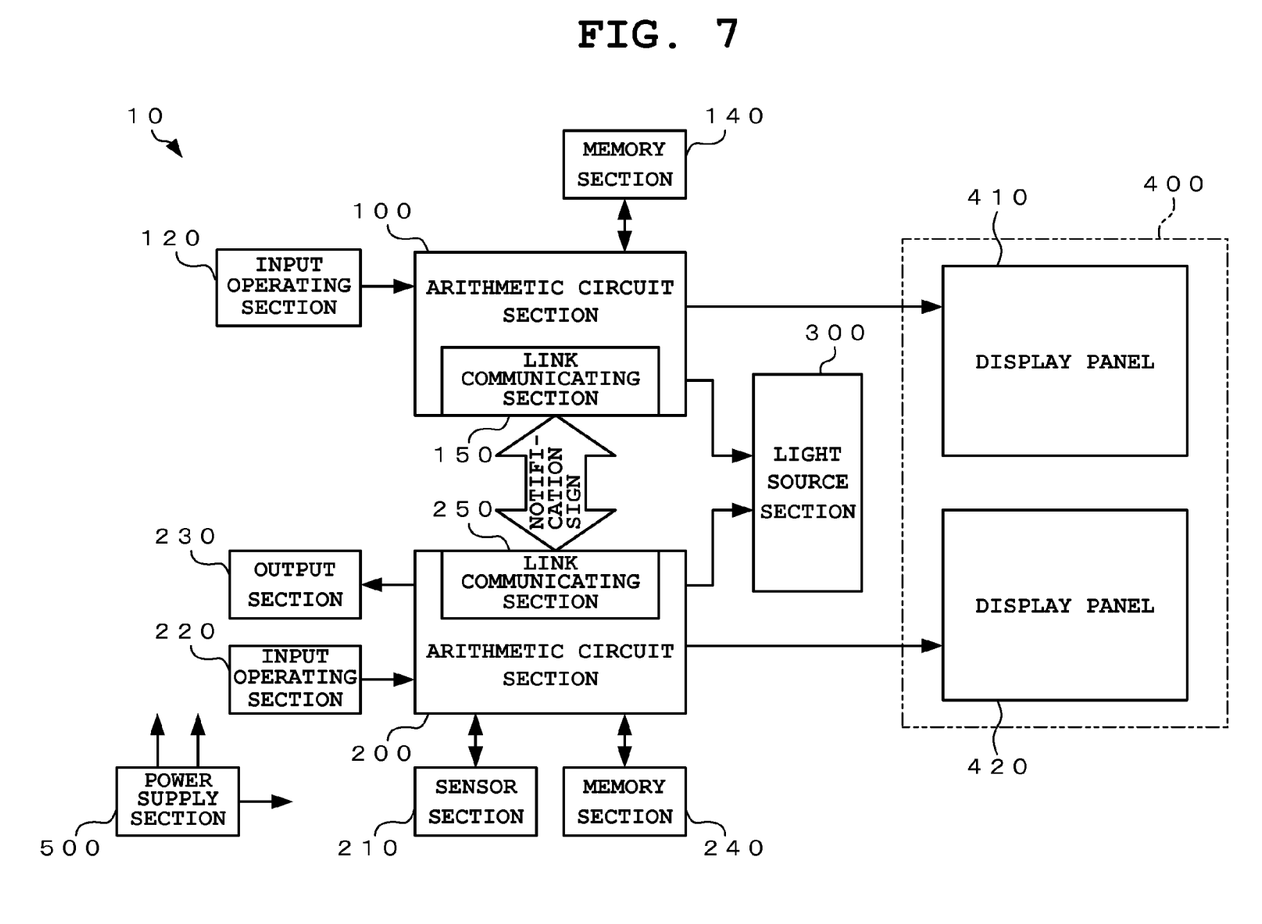
FIG. 7 is a schematic block diagram showing a second embodiment of the electronic device including the light source device according to the present invention.

FIG. 7 is a schematic block diagram showing the second embodiment of the electronic device including the light source device according to the present invention. Here, sections equivalent to those of the above-described first embodiment are provided with the same reference numerals, and described briefly.

In the first embodiment, only one display panel is provided to the display section 400 and the display status is controlled by the arithmetic circuit section 100 having a high processing power. The second embodiment has a feature in which a plurality of (here, two) display panels are provide to the display section 400 and each of the arithmetic circuit section 100 and the arithmetic circuit section 200 controls the display status of a corresponding one of the individual display panels.

Specifically, the electronic device 10 according to this embodiment has, for example, a set of two arithmetic circuit sections 100 and 200 having different processing powers and the display section 400 including a display panel (first display panel) 410 whose display status is controlled by the arithmetic circuit section 100 and a display panel (second display panel) 420 whose display status is controlled by the arithmetic circuit section 200, as depicted in FIG. 7. Also, the electronic device 10 has the light source section 300 in which the light emission status of the light source 310 is controlled by both of the arithmetic circuit section 100 and the arithmetic circuit section 200. Note that the other sections of the present embodiment depicted in FIG. 7 are equivalent to those of the first embodiment described above, and therefore are not described herein.

In the display section 400, the display panels 410 and 420 are each provided with an image memory and a display driver omitted in the drawing. Various information generated by the arithmetic circuit section 100 are stored in the image memory, and displayed on the display panel 410 in a predetermined form by the display driver. On the other hand, various information generated by the arithmetic circuit section 200 are stored in the image memory, and displayed on the display panel 420 in a predetermined form by the display driver.

As at least one of the display panels 410 and 420 provided to the display section 400, a transmission-type display panel is adopted. On the back surface side of the transmission-type display panel, the light source 310 of the light source section 300 is arranged. Here, the display panels 410 and 420 are structured to be arranged in parallel such that they are not superimposed on each other in a planar view when viewed from a user view field side, or structured to be arranged independently. In a structure where both of the display panels 410 and 420 are transmission-type display panels, for example, the display panels 410 and 420 are arranged to be superimposed on each other in a planar view and the light source 310 is arranged on the backmost surface side.

As with the first embodiment, as the arithmetic circuit section 100 which controls the display status of the display panel 410 provided to the display section 400, an arithmetic circuit having a relatively high processing power (high-power, high-performance processor) is adopted. As a result, a display panel capable of achieving high-functionality display (such as color display and visual effects of high-definition still images and moving images) can be adopted as the display panel 410. Specifically, a transmission-type TFT color liquid-crystal panel can be favorably adopted as the display panel 410, as with the first embodiment described above.

On the other hand, as the arithmetic circuit section 200 which controls the display status of the display panel 420 provided to the display section 400, an arithmetic circuit having a relatively low processing power (low-power, low-performance processor) is adopted, as with the first embodiment. As a result, a display panel that can be driven for display with relatively low power consumption and screen display that can be displayed with low power consumption are adopted for the display panel 420.

Specifically, as the display panel 420, a PN (Polymer Network)-type or PD (Polymer Dispersed)-type liquid-crystal panel of a reflection type with excellent outdoor visual recognition or a display panel for use in electronic paper can be favorably applied. Alternatively, clock display, simple figure display, still picture display, and display of an image whose number of updates in screen display is small, all of which can be driven for display with low power consumption, can be displayed on the display panel 420. In the latter case, the display panel 420 is not limited to a PN-type or PD-type liquid-crystal panel, an electronic paper, or the like, and a TFT color liquid-crystal panel or the like may be applied, as with the display panel 410.

In a method for controlling the electronic device 10 including this display device, in a normal operation, high-functionality display is performed on the display panel 410 by the arithmetic circuit section 100 having a high processing power, and simple display is performed on the display panel 420 by the arithmetic circuit section 200 having a low processing power, as with the first embodiment described above (refer to FIG. 4 and FIG. 5) Here, the arithmetic circuit section 100 and the arithmetic circuit section 200 operate in conjunction with each other by transmitting and receiving a notification signal to and from each other via the link communicating sections 150 and 250, and light emission control for lighting the light source 310 of the light source section 300 with predetermined light emission luminance is performed by the arithmetic circuit section 100 in accordance with the display status of each of the display panels 410 and 420.

Here, in the structure where the display panels 410 and 420 are arranged in parallel without being superimposed on each other in a planar view or arranged independently, screen display on the transmission-type display panels (the display panel 410 and the display panel 420) can be visually recognized by the user by the light of the light source 310 being applied from the back surface side of the display panels. Also, when the display section 400 has a non-transmission-type display panel (for example, the display panel 420), screen display is visually recognized by the user directly. On the other hand, in the structure where the transmission-type display panels 410 and 420 are arranged to be superimposed on each other in a planar view, screen display on the display panel 410 and screen display on the display panels 420 are combined and higher-functionality display is visually recognized by the user by the light of the light source 310 being applied from the backmost surface side of the display panels 410 and 420.

When a state where screen display on the display panel 410 has not been updated or a user input operation has not been performed is continued for the predetermined period of time (t1), the arithmetic circuit section 100 shifts to a low power consumption operation to dim the light emission luminance of the light source 310. In this dimmed state, when a state where screen display on the display panel 410 has not been updated or a user input operation has not been performed is continued for the predetermined period of time (t2), the arithmetic circuit section 100 transmits a predetermined notification signal to the arithmetic circuit section 200 and enters a non-operating state. As a result, the arithmetic circuit section 200 performs light emission control for the light source 310 of the light source section 300 and a monitoring operation for a user input operation, in place of the arithmetic circuit section 100.

Then, when an update of screen display on the display panel 410 or a user input operation is detected, the arithmetic circuit section 200 transmits a predetermined notification signal to the arithmetic circuit section 100 so that the arithmetic circuit section 100 returns from the non-operating state and perform a normal operation. As a result, the arithmetic circuit section 100 performs high-functionality display on the display panel 410, and operates in conjunction with the arithmetic circuit section 200 so as to perform light emission control for lighting the light source 310 with predetermined light emission luminance in accordance with the display status of each of the display panels 410 and 420.

As such, in this embodiment as well, when a processing load on the arithmetic circuit section 100 having a high processing power is relatively low because it is controlling only the light source section 300 and not performing other processing operations, part of the functions of the arithmetic circuit section 100 is performed by the arithmetic circuit section 200 having a low processing power, so that the arithmetic circuit section 100 can enter a non-operating state early, as with the above-described first embodiment. As a result, the period of the non-operating state of the arithmetic circuit section 100 is increased at maximum and the power consumption of the arithmetic circuit section 100 is reduced, whereby the driving time of the electronic device can be improved.

In the present embodiment, as a light emission control method for the light source 310 in normal operation, a method has been described in which the arithmetic circuit section 100 operates in conjunction with the arithmetic circuit section 200 to perform the overall control. However, the present invention is not limited thereto. The electronic device according to the present invention may adopt a method in which light emission control for the light source 310 is performed by the arithmetic circuit section 100 when image display is performed only on the transmission-type display panel 410, and light emission control for the light source 310 is performed by the arithmetic circuit section 200 when image display is performed only on the transmission-type display panel 420. In this method as well, when the state where screen display on the display panel 410 has not been updated or a user input operation has not been performed is continued for a predetermined period of time (t1+t2), the arithmetic circuit section 100 enters a non-operating state, and light emission control for the light source 310 is performed by the arithmetic circuit section 200.

Also, a method may be adopted in which, when linked images or independent images are displayed on both of the display panels 410 and 420, if the number of rewrites of screen display is small as in a case where a simple image or a still image is displayed on the display panel 410 or the display panel 410 has a memory feature of retaining image display for a predetermined period, the arithmetic circuit section 100 enters a non-operating state, and the light source 310 is controlled by the arithmetic circuit section 200 having a low processing power, whereby the power consumption of the arithmetic circuit section 100 can be saved. If the number of rewrites of screen display is large as in a case where a moving image is displayed on the display panel 410 and the arithmetic circuit section 100 is operating continuously, the light source 310 is controlled by the arithmetic circuit section 100 having a high processing power, whereby high-functionality display can be favorably achieved and the display quality can be improved.

While the present invention has been described with reference to the preferred embodiments, it is intended that the invention be not limited by any of the details of the description therein but includes all the embodiments which fall within the scope of the appended claims.

What is claimed is:

1. An electronic device comprising:
a first processor;
a second processor;
a first display panel which is connected to the first processor and controlled by the first processor;
a second display panel which is connected to the second processor and controlled by the second processor; and
a light source which is connected to both the first processor and the second processor, whose light emission status is controlled alternately by the processors, and which illuminates both the first display panel and the second display panel, wherein the first processor is shifted from a control state of controlling the light source to a non-control state of not controlling the light source and the second processor is shifted from the non-control state of not controlling the light source to the control state of controlling the light source, along with a shift of the first processor from an operating state to a non-operating state.

2. The electronic device according to claim 1, further comprising:
a peripheral circuit which is connected to the first processor and controlled by the first processor,
wherein the second processor is shifted from the non-control state to the control state when the first processor is shifted from the control state of controlling the light source and controlling the peripheral circuit to a state where the first processor is not required to control the peripheral circuit.

3. The electronic device according to claim 2, wherein the first processor is shifted from the non-control state to the control state when the first processor enters a state where the first processor is required to control the peripheral circuit while the second processor is in the control state.

4. The electronic device according to claim 1, wherein the first processor has a link communicating circuit which transmits to and receives from the second processor a control signal for operating in conjunction with the second processor, and
wherein operation of a portion of the first processor including a circuit which outputs a light source control signal is stopped in the non-operating state, while operation is maintained of a circuit of the link communicating circuit which receives a specific control signal transmitted from the second processor for causing the first processor to be shifted from the non-operating state to the control state.

5. The electronic device according to claim 1, further comprising:
a detector which detects a signal related to a user input operation,
wherein the first processor and the second processor selectively control the light source based on display status of the first display panel and the second display panel and a detection result by the detector.

6. The electronic device according to claim 5, wherein the first processor and the second processor set the first processor in the non-operating state and set the second processor in the control state when a time period in which a user input operation has not been detected by the detector and information displayed on the first display panel has not been updated exceeds a predetermined amount of time while the first processor is in the control state, and
wherein the first processor and the second processor shift the first processor from the non-operating state to the control state when a user input operation is detected by the detector or the information displayed on the first display panel is updated while the second processor is in the control state.

7. The electronic device according to claim 6, wherein the second display panel is a transmissive liquid-crystal display panel, and
wherein the light source is arranged on a back surface side of the first display panel and the second display panel.

8. The electronic device according to claim 6, wherein the second display panel is a transmissive liquid-crystal display panel, and
wherein the first display panel and the second display panel are arranged such that the first display panel and the second display panel are superimposed on each other in a planar view when viewed from a view field side of a user, and the light source is arranged on a backmost surface side of the first display panel and the second display panel.

9. A method for controlling an electronic device including a first processor, a second processor, a first display panel which is connected to the first processor and controlled by the first processor, a second display panel which is connected to the second processor and controlled by the second processor, and a light source which is connected to both the first processor and the second processor, whose light emission status is controlled alternately by the processors, and which illuminates both the first display panel and the second display panel, the method comprising:
shifting the first processor from a control state of controlling the light source to a non-control state of not controlling the light source; and
shifting the second processor from the non-control state of not controlling the light source to the control state of controlling the light source, along with a shift of the first processor from an operating state to a non-operating state.

10. The method according to claim 9,
wherein the shifting the first processor and the shifting the second processor are performed such that the first processor normally performs control of the light source in accordance with an operation status of the first processor, and the second processor takes over the control of the light source when the first processor enters the non-operating state.

11. The method according to claim 10, wherein the second processor controls the light source with the first processor remaining in the non-operating state when the first processor enters the non-operating state and only the second display panel is lit.

12. The method according to claim 10, wherein the electronic device further includes a detector which detects a signal related to a user input operation,
wherein the shifting the first processor includes:
controlling the light source to be turned on by the first processor; and
controlling the light source to be dimmed by the first processor when a signal related to a user input operation is not detected by the detector for a predetermined amount of time (t1); and
wherein the shifting the second processor includes:
causing the first processor to be in the non-operating state and controlling the light source to be turned on by the second processor when a signal related to a user input operation is not detected by the detector for a predetermined amount of time (t2) after the controlling the light source to be dimmed; and
controlling the light source to be turned off by the second processor when a signal related to a user input operation is not detected by the detector for a predetermined amount of time (t3) after the second processor controls the light source to be turned on.

13. The electronic device control method according to claim 10, further comprising:
causing the first processor to return from the non-operating state and controlling the light source to be turned on when a signal related to a user input operation is detected by the detector after the controlling the light source to be turned off.

14. A non-transitory computer-readable storage medium having stored thereon a program for controlling an electronic device including a first processor, a second processor, a first display panel which is connected to the first processor and controlled by the first processor, a second display panel which is connected to the second processor and controlled by the second processor, and a light source which is connected to both the first processor and the second processor, whose light emission status is controlled alternately by the processors, and which illuminates both the first display panel and the second display panel, the program being executable by a computer including the first processor and the second processor to perform functions comprising:

shifting the first processor from a control state of controlling the light source to a non-control state of not controlling the light source; and     shifting the second processor from the non-control state of not controlling the light source to the control state of controlling the light source, along with a shift of the first processor from an operating state to a non-operating state.

* * * * *